(12) United States Patent
Chen et al.

(10) Patent No.: US 8,746,909 B2
(45) Date of Patent: Jun. 10, 2014

(54) BACKLIGHT MODULE

(75) Inventors: Ming-Lung Chen, Hsin-Chu (TW); Kun-Hung Hsieh, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 434 days.

(21) Appl. No.: 13/300,250

(22) Filed: Nov. 18, 2011

(65) Prior Publication Data

US 2012/0275139 A1 Nov. 1, 2012

(30) Foreign Application Priority Data

Apr. 29, 2011 (TW) .............................. 100115145 A

(51) Int. Cl.
*F21V 7/04* (2006.01)
(52) U.S. Cl.
USPC ........... 362/97.1; 362/607; 362/612; 362/616
(58) Field of Classification Search
USPC ........ 362/97.1, 607, 612, 616, 606, 609, 611, 362/64
See application file for complete search history.

(56) References Cited

U.S. PATENT DOCUMENTS

| | | | |
|---|---|---|---|
| 2003/0117790 A1 | 6/2003 | Lee et al. | |
| 2006/0291064 A1 * | 12/2006 | Yao et al. | ..................... 359/619 |
| 2009/0086508 A1 | 4/2009 | Bierhuizen | |
| 2009/0185107 A1 | 7/2009 | Panagotacos et al. | |
| 2010/0079980 A1 | 4/2010 | Sakai et al. | |

FOREIGN PATENT DOCUMENTS

| | | |
|---|---|---|
| JP | 2000180634 | 6/2000 |
| JP | 2001-133779 | 5/2001 |
| JP | 2002208307 | 7/2002 |
| JP | 2004319340 | 11/2004 |
| JP | 2007026702 | 2/2007 |
| JP | 2007180021 | 7/2007 |
| JP | 2007180022 | 7/2007 |
| JP | 2007188863 | 7/2007 |
| JP | 2010108919 | 5/2010 |
| KR | 1020090073452 | 7/2009 |
| TW | 200403502 | 3/2004 |
| TW | 594119 B | 6/2004 |
| TW | I276887 | 3/2007 |
| TW | M347588 | 12/2008 |

* cited by examiner

*Primary Examiner* — Joseph L Williams
(74) *Attorney, Agent, or Firm* — WPAT, PC; Justin King

(57) ABSTRACT

A backlight module is disclosed, which includes plural light sources, a light guide plate, a light scattering device, a high-reflectance microstructure formed on the light guide plate, and a high-diffusion microstructure formed on the light guide plate. The light guide plate has a first surface and a second surface opposite to the first surface. The first surface faces the light sources. The light scattering device is disposed between the light sources and the light guide plate. The high-reflectance microstructure is formed on the second surface. The high-diffusion microstructure is formed on or indented inwardly from the first surface.

22 Claims, 6 Drawing Sheets

BACKLIGHT MODULE

RELATED APPLICATIONS

This application claims priority to Taiwan Application Serial Number 100115145, filed Apr. 29, 2011, which is herein incorporated by reference.

BACKGROUND

1. Field of Invention

The present invention relates to a backlight module. More particularly, the present invention relates to a bottom-lighting-type backlight module.

2. Description of Related Art

Liquid crystal displays (LCDs) have been widely used in electrical products in recent times due to the rapid progress of optical technology and semiconductor technology. Moreover, with the advantages of high image quality, compact size, light weight, low driving voltage, and low power consumption, LCDs have been introduced into portable computers, personal digital assistants, and color televisions, and are gradually replacing the cathode ray tubes (CRTs) used in conventional displays. As a result, LCDs have become the most widely used display apparatus. An LCD includes the main elements of a liquid crystal panel and a backlight module. The backlight module provides a stable plane light source to the liquid crystal panel. Depending on the location of the light sources in the LCD, the backlight module can be referred to as a side-lighting-type backlight module or a bottom-lighting-type backlight module. In the side-lighting-type backlight module, the light sources are disposed at a side surface of a light guide plate, and the light is transmitted to the front for lighting the liquid crystal panel via the light guide plate. Side-lighting-type backlight modules are mostly used in small LCDs. In the bottom-lighting-type backlight module, the light sources are disposed on a bottom surface of a light guide plate, and the light is emitted from rear to front.

Modern electronic apparatuses are becoming increasingly lighter and thinner. Therefore, the thickness of the bottom-lighting-type backlight module has become an issue during design. There is a need to improve the lighting efficiency of the bottom-lighting-type backlight module and reduce the thickness thereof.

SUMMARY

The present invention provides a thin bottom-lighting-type backlight module to reduce the thickness of a liquid crystal display.

An embodiment of the invention provides a backlight module, which includes plural light sources, a light guide plate, a light scattering device, a high-reflectance microstructure formed on the light guide plate, and a high-diffusion microstructure formed on the light guide plate. The light guide plate has a first surface and a second surface opposite to the first surface. The first surface faces the light sources. The light scattering device is disposed between the light sources and the light guide plate. The high-reflectance microstructure is formed on the second surface. The high-diffusion microstructure is formed on or indented inwardly from the first surface.

The pattern density of the high-reflectance microstructure is gradually reduced from each of the light sources. The covering ratio of the high-reflectance microstructure at areas corresponding to the light sources is greater than 70%, and the covering ratio of the high-reflectance microstructure at areas corresponding to a middle of the neighboring light sources is greater than 30%. The reflectance of the high-reflectance microstructure is greater than 70%.

The pattern density of the high-diffusion microstructure is gradually increased from each of the light sources. The covering ratio of the high-diffusion microstructure at areas corresponding to the middle of the neighboring light sources is greater than 70%. The covering ratio of the high-diffusion microstructure at areas corresponding to the light sources is approximately from 0% to 10%. The high-diffusion microstructure can be a raised structure formed on the first surface or a concave structure indented inwardly from the first surface.

The light scattering device is disposed on the first surface and comprises plural aspheric cavities, and the light sources are placed in the aspheric cavities, respectively. The profile of the aspheric cavities can be bullet-shaped. The backlight module further comprises plural lenses disposed on the light sources, and each lens has a concave profile. Each aspheric cavity can have a flat top surface, and the backlight module further comprises a plurality of Fresnel lenses each formed on the flat top surface of one of the aspheric cavities. The first surface can be a flat surface, and the light scattering device comprises a plurality of Fresnel lenses formed on the flat surface.

The backlight module further includes at least one reflector. The reflector has plural openings, and the light sources are disposed respectively in the openings. The distance between the light sources and the first surface can be less than the distance between the reflector and the first surface.

The backlight module further includes a back plate. The back plate has plural recesses, and the light sources are disposed respectively in the recesses. The reflector has plural inclined surfaces for defining the openings. The backlight module further includes a high-diffusion plate disposed on the high-reflectance microstructure. The transmittance of the high-diffusion plate is less than 70%.

The present invention includes the high-reflectance microstructure and the high-diffusion microstructure formed on the light guide plate to reduce normal light of the light sources, and the light emitted from the light sources can diffuse laterally, such that the backlight module provides a uniform plane light source. The backlight module includes the light scattering device to realize a large refraction angle of the light emitted from the light sources in order to reduce normal light. The high-diffusion plate can further make the light passing through the light guide plate more uniform.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
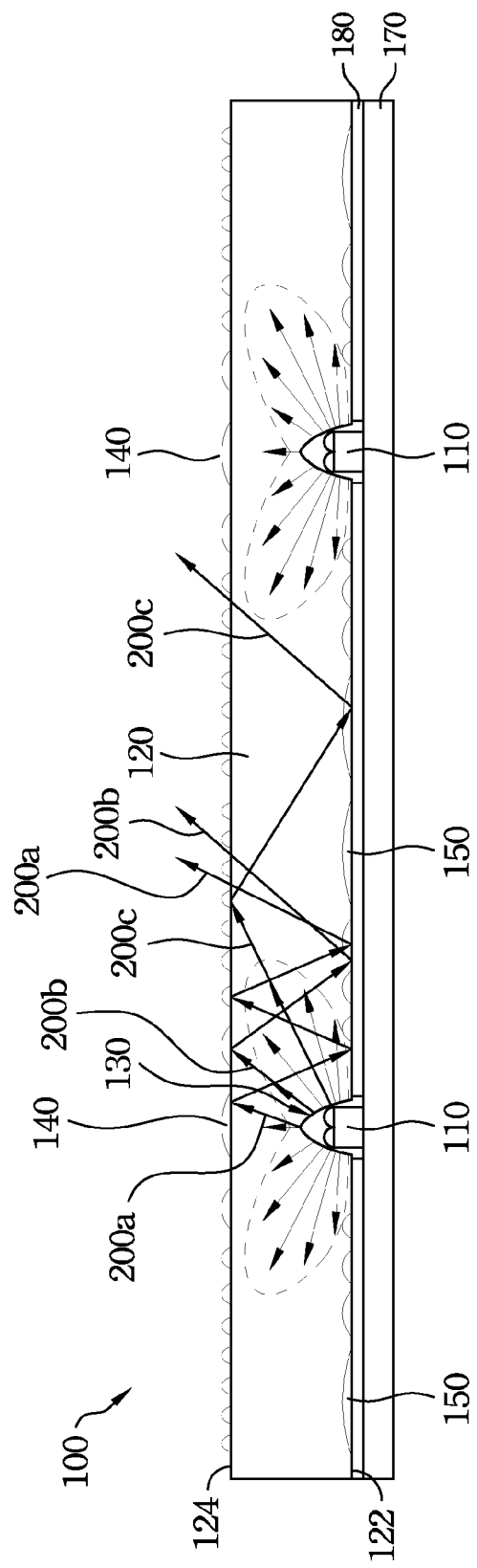
FIG. 1 is a cross-sectional diagram of an embodiment of a backlight module of the invention.

Reference will now be made in detail to the present embodiments of the invention, examples of which are illustrated in the accompanying drawings. Wherever possible, the same reference numbers are used in the drawings and the description to refer to the same or like parts. The number of the elements is not limited by the drawings.

FIG. 1 is a cross-sectional diagram of a first embodiment of a backlight module of the invention. The backlight module 100 includes plural light sources 110, a light guide plate 120, a light scattering device 130, a high-reflectance microstructure 140, and a high-diffusion microstructure 150. The light guide plate 120 has a first surface 122 and a second surface 124 opposite to the first surface 122. The first surface 122 is the surface of the light guide plate 120 facing the light sources 110. The light scattering device 130 is disposed between the light sources 110 and the light guide plate 120. The high-reflectance microstructure 140 is formed on the second surface 124 of the light guide plate 120. The high-diffusion microstructure 150 is formed on the first surface 122 of the light guide plate 120.

The high-diffusion microstructure 150 can be formed on the light guide plate 120 by an injection molding process, hot pressing process, etching process, printing process, etc. The high-reflectance microstructure 140 can be formed on the light guide plate 120 by, for example, a printing process. The high-reflectance microstructure 140 can be a raised structure protruding from the second surface 124. Depending on the particular processing and design requirements, the high-diffusion microstructure 150 can be a raised structure protruding from the first surface 122, or the high-diffusion microstructure 150 can be a concave structure indented from the first surface 122 and disposed within the light guide plate 120. Each of the high-reflectance microstructure 140 and the high-diffusion microstructure 150 can be formed of elements that are circular. In other embodiments, the shape of the elements forming each of the high-reflectance microstructure 140 and the high-diffusion microstructure 150 can be elliptical, polygonal, or irregular in shape.

The reflectance of the high-reflectance microstructure 140 is greater than 70%, preferably greater than 90%. The high-reflectance microstructure 140 is formed on the second surface 124 of the light guide plate 120 by a printing process in this embodiment. The high-reflectance microstructure 140 is made of $TiO_2$ ink in this embodiment.

Figure 2:
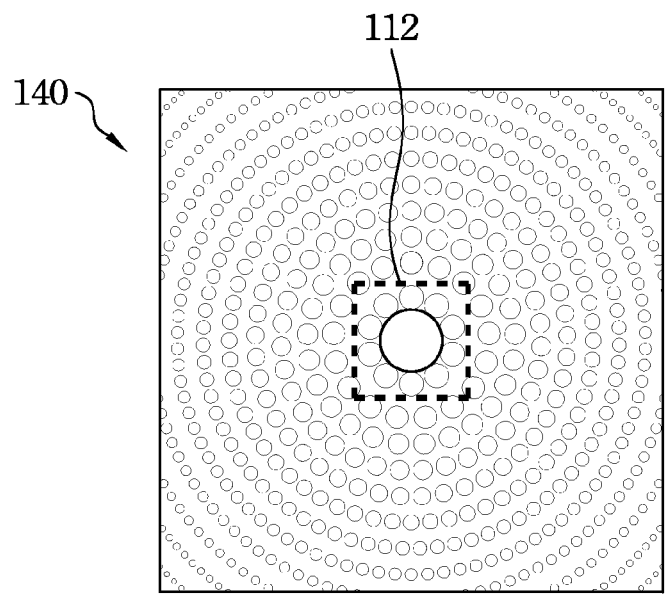
FIG. 2 is a top view of a part of a high-reflectance microstructure.

Reference is made to both FIG. 1 and FIG. 2. FIG. 2 is a top view of a part of the high-reflectance microstructure 140. The pattern density of the high-reflectance microstructure 140 is gradually reduced from each light source 110. Namely the high-reflectance microstructure 140 has the largest covering ratio on the second surface 124 at areas corresponding to light emitting surfaces 112, each of which is a region corresponding to the light sources 110 and extending a predetermined distance therefrom, and has the lowest covering ratio at areas corresponding to the middle of two adjacent light sources 110. The covering ratio mentioned above refers to the ratio of elements forming the high-reflectance microstructure 140 in a unit area. For example, the covering ratio is 100% when the elements forming the high-reflectance microstructure 140 covers a unit area completely, and the covering ratio is 0% when there is no high-reflectance microstructure 140 in the unit area. The covering ratio of the high-reflectance microstructure 140 at areas corresponding to the light sources 110 is greater than 70%, i.e., the covering ratio of the high-reflectance microstructure 140 at areas corresponding to where light from the light sources 110 is projected into the light guide plate 120 with the greatest intensity is greater than 70%. Stated differently, the covering ratio of the high-reflectance microstructure 140 on the second surface 124 at areas corresponding to the light emitting surfaces 112 is greater than 70%. In order to prevent local dimming caused of periodic microstructure arrangement, the covering ratio of the high-reflectance microstructure 140 at areas of the second surface 124 of the light guide plate 120 corresponding to the middle of two adjacent light sources 110 is preferably greater than 30%.

As shown in FIG. 1, the high-diffusion microstructure 150 can be formed on the first surface 122 of the light guide plate 120 by, for example, an etching process. The high-diffusion microstructure 150 can be made of $SiO_2$. In contrast to the high-reflection microstructure 140, the pattern density of the high-diffusion microstructure 150 is gradually increased from each light source 110. Namely the high-diffusion microstructure 150 has the lowest covering ratio on the first surface 122 at areas corresponding to the light emitting surfaces 112 of the light sources 110 and has the greatest covering ratio at areas corresponding to the middle of two adjacent light sources 110. The covering ratio mentioned above refers to the ratio of the elements forming the high-diffusion microstructure 150 in a unit area. For example, the covering ratio is 100% when the elements forming the high-diffusion microstructure 150 covers a unit area completely, and the covering ratio is 0% when there is no high-diffusion microstructure 150 in the unit area. The covering ratio of the high-diffusion microstructure 150 at areas corresponding to where light from the light sources 110 is projected into the light guide plate 120 with the greatest intensity is approximately from 0% to 10%. Stated differently, the covering ratio of the high-diffusion microstructure 150 on the first surface 122 at areas corresponding to the light-emitting surfaces 112 is from 0% to 10%. The covering ratio of the high-diffusion microstructure 150 at areas of the first surface 122 of the light guide plate 120 corresponding to the middle of two adjacent light sources 110 is about 70%.

Figure 3:
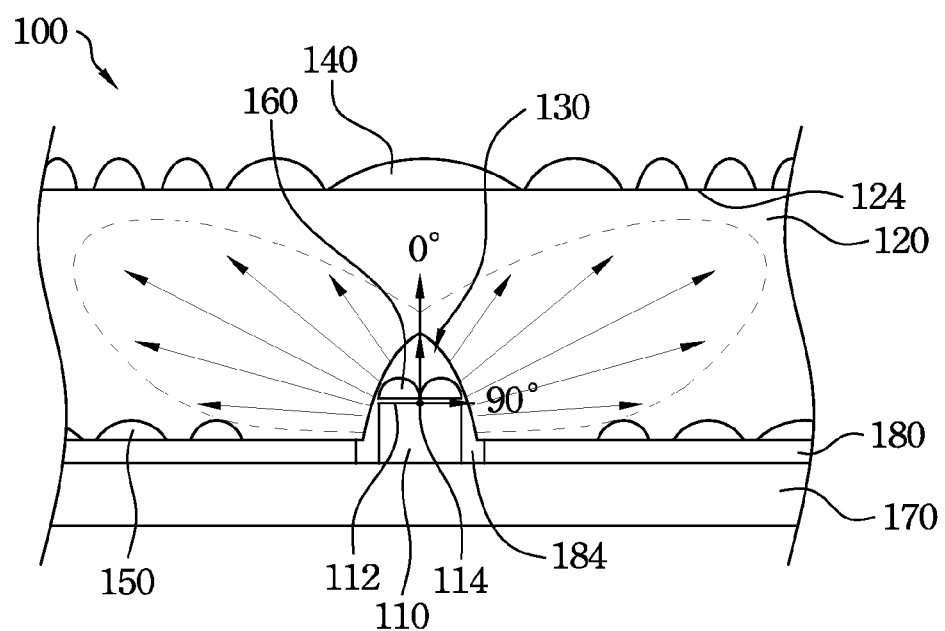
FIG. 3 is a partially enlarged drawing of FIG. 1.

FIG. 3 is a partially enlarged drawing of FIG. 1. The light scattering device 130 includes plural aspheric cavities. The light scattering device 130 is disposed on the first surface 122 of the light guide plate 120. The light sources 110 are placed in the aspheric cavities of the light scattering device 130. Each of the aspheric cavities has a bullet-shape profile. The center of the light emitting surface 112 of each light source 110 is referred to as a defining point 114. The profile of each aspheric cavity is such that the distance between the defining point 114 and the aspheric cavity is gradually reduced from the top (0°) of the aspheric cavity to the side (90°) of the aspheric cavity. Namely, the distance between the defining point 114 and the top (0°) of the aspheric cavity is greatest, and the distance between the defining point 114 and the side (90°) of the aspheric cavity at points thereof closes to the light emitting surface 112 of the light source 110 is smallest. Such a design can prevent over normal light emitting.

The structure of the aspheric cavity may be such that it satisfies the following equation:

$$R_1(0°)-R_1(\theta)>0, 90°>\theta>0°$$

where $R_1$ is the distance between the defining point 114 and the aspheric cavity, and θ is the angle started from the top of the aspheric cavity.

The backlight module 100 further includes plural lenses 160. The lenses 160 are disposed on the light sources 110 respectively. The lenses 160 are located within the light scattering device 130. The lenses 160 can be far field light field type lenses with reduced center intensity. Such lenses 160 can be used to reduce local dimming caused by periodic microstructure arrangement on the light guide plate 120. Each lens 160 has a concave profile in order to reduce center intensity of the light sources 110. The structure of the lens 160 may be such that it satisfies the following equation:

$$R_2(0°)-R_2(θ)<0; \text{ and}$$

$$R_2(θ_1)-R_2(θ_2)<0, \text{ wherein } θ_1<θ_2$$

where $R_2$ is the distance from the defining point 114 to the light emitting surface 112 of the lens 160, and θ is the angle between the line from the defining point 114 to the light emitting surface 112 of the lens 160 and the line from the defining point 114 to the concave center of the lens 160.

The backlight module 100 further includes a substrate 170 and a reflector 180. The reflector 180 is disposed between the light guide plate 120 and the substrate 170. The light sources 110 are disposed on the substrate 170 and are electrically connected to the substrate 170. The light sources 110 are controlled by signals from the substrate 170. The reflector 180 has plural openings 184 thereon to respectively receive the light sources 110 disposed on the substrate 170. The substrate 170 can be a printed circuit board, flexible printed circuit board, or Al substrate.

Light emitted toward the second surface 124 is reflected by the high-reflectance microstructure 140 and diffused by the high-diffusion microstructure 150, so that the light can be transmitted over a wider area in the light guide plate 120, and the backlight module 100 can provide a uniform plane light source.

Referring back to FIG. 1, light 200a with a smaller emitting angle is emitted toward the high-reflectance microstructure 140 having a high cover ratio above the light source 110, and the light 200a is reflected back toward the light source 110. There is a small angle difference between the incident light and the reflected light, so that the light 200a is further emitted toward sides of the light source 110. The high-diffusion microstructure 150 at the sides of the light source 110 has a lower covering ratio, and therefore, most of the light 200a is emitted on the reflector 180 and is reflected by the reflector 180. The light 200a is further reflected toward the high-reflectance microstructure 140 once again. The light 200a is reflected back and forth between the reflector 180 and the high-reflectance microstructure 140, and some of the light 200a is emitted from the second surface 124 during the reflecting process. The high-diffusion microstructure 150 can diffuse the light 200a more equally. When the light 200a diffuses to the middle of two neighboring light sources 110 with a lower covering ratio of the high-reflectance microstructure 140, the light 200a can be emitted from the light guide plate 120 at this position easily.

The light 200b and 200c with a larger emitting angle emitted from the light source 110 is emitted toward the middle of two adjacent light sources 110 with a lower covering ratio of the high-reflectance microstructure 140. For example, there is a higher possibility that the light 200b will not contact one of the elements forming the high-reflectance microstructure 140 and therefore will be emitted from the middle of two neighboring light sources 110. The light 200c with a different emitting angle contacts one of the elements of the high-reflectance microstructure 140 and is further reflected by the high-reflectance microstructure 140. The light 200c has a larger incident angle, so that the lateral diffusing distance of the light 200c is enlarged.

As discussed above, the light with a smaller emitting angle, such as the light 200a in FIG. 1, is reflected in the light guide plate 120 and is not easily emitted from an area corresponding to the top of the light source 110 in a direct manner. The light with a smaller emitting angle, such as the light 200a, tends to be reflected in the light guide plate 120 and finally emits from the middle of two adjacent light sources 110. The light with a larger emitting angle tends to emit at the middle of two adjacent light sources 110, such as light 200b, or laterally diffuses in the light guide plate 120, such as the light 200c. Therefore, bright portions at areas directly above the light sources 110 can be prevented. The lateral distance of the light diffusing in the light guide plate 120 is enlarged, and the light tends to emit between the light sources 110 but not from areas corresponding to the top of the light sources 110. As a result, the brightness of the backlight module 100 can be more uniform.

The normal center intensity of the light sources 110 in the backlight module 100 can be reduced to make more uniform the brightness of the backlight module 100 by the light scattering device 130, the high-reflectance microstructure 140, the high-diffusion microstructure 150 and the lenses 160. Furthermore, the light sources 110 are disposed in the aspheric cavities of the light scattering device 130 to thereby be disposed in the light guide plate 120. Therefore the thickness of the bottom-lighting-type backlight module 100 can be reduced.

A description of the features of the high-reflectance microstructure 140 and the high-diffusion microstructure 150 will not be repeated in the following embodiments.

Figure 4:
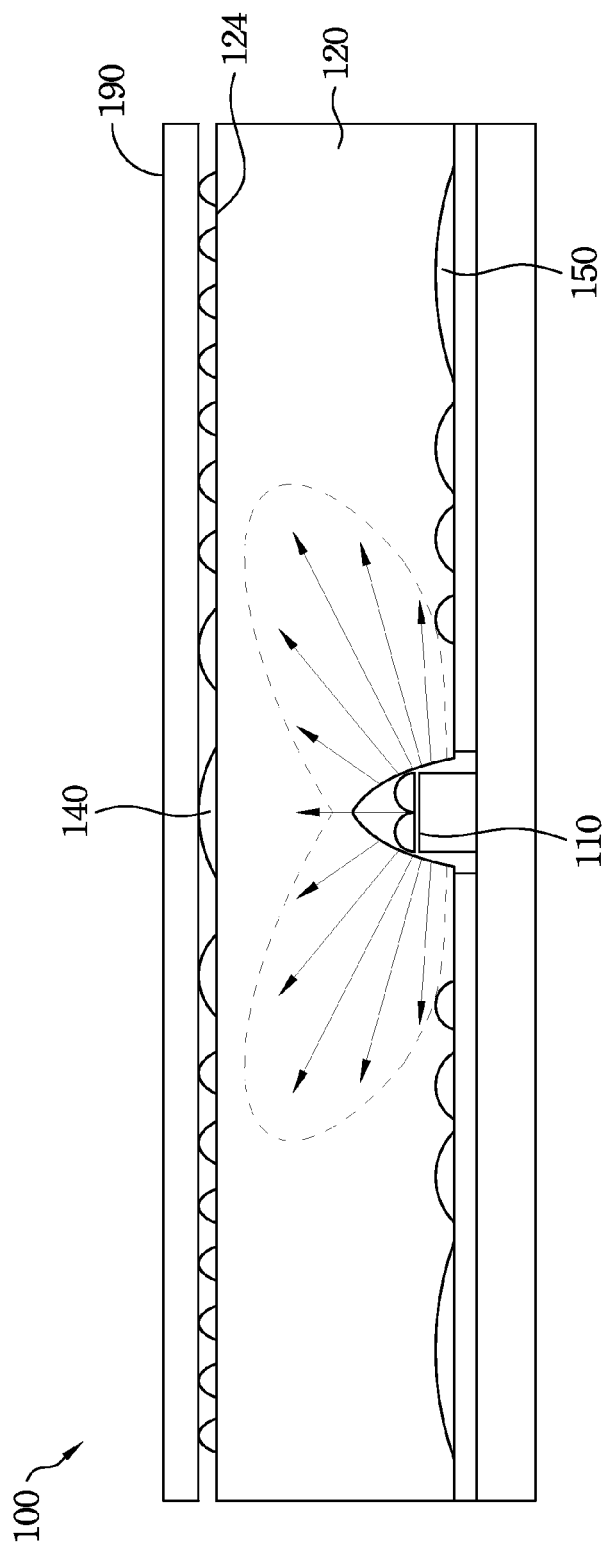
FIG. 4 is a cross-sectional diagram of a second embodiment of the backlight module of the invention.

FIG. 4 is a cross-sectional diagram of a second embodiment of the backlight module of the invention. In this embodiment, the backlight module 100 further includes a high-diffusion plate 190 disposed on the high-diffusion microstructure 150. The transmittance of the high-diffusion plate 190 is less than 20%. The high-diffusion plate 190 can be used to blur the light from the high-reflectance microstructure 140 on the second surface 124 of the light guide plate 120 to mix the light from the light sources 110 more uniformly.

Figure 5:
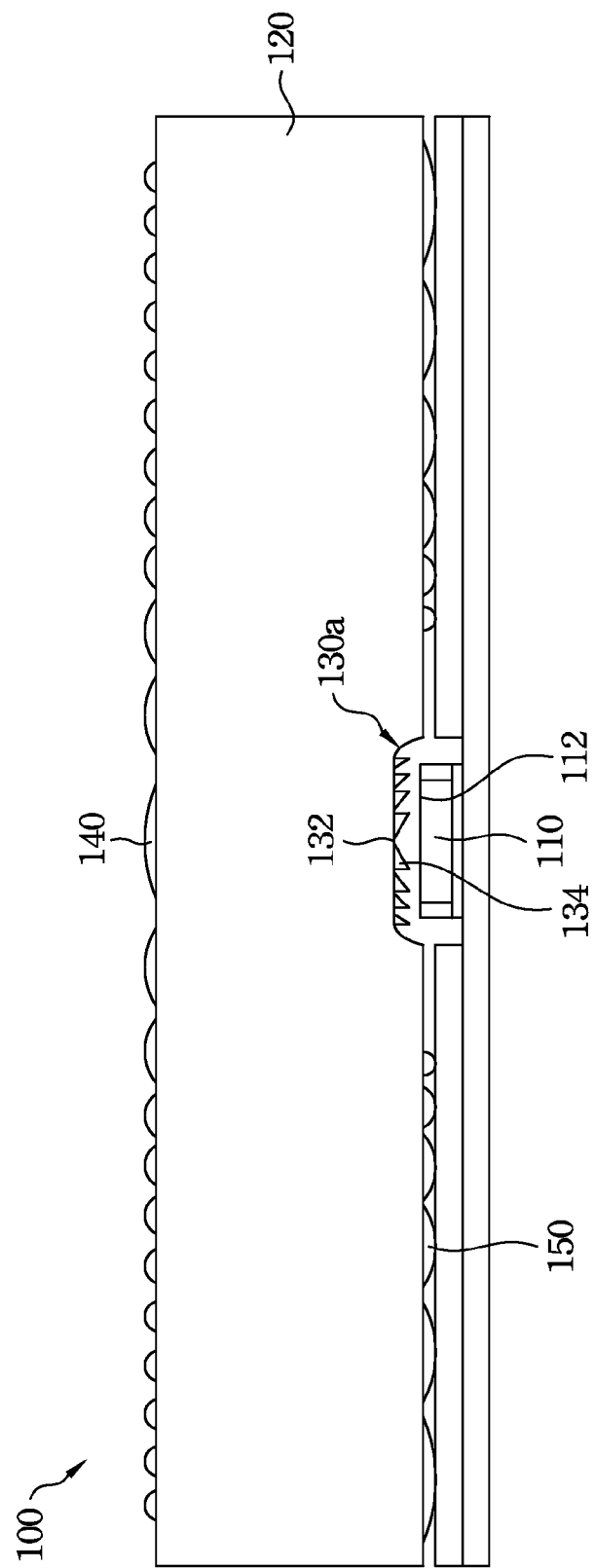
FIG. 5 is a cross-sectional diagram of a third embodiment of the backlight module of the invention.

FIG. 5 is a cross-sectional diagram of a third embodiment of the backlight module of the invention. The light scattering device 130a includes aspheric cavities. Each aspheric cavity has a flat top surface 132. The backlight module 100 further includes a plurality of Fresnel lenses 134 each formed on the flat top surface 132 of one of the aspheric cavities of the light scattering device 130a. Describing the structure corresponding to one of the light sources 110 as shown in FIG. 5, the Fresnel lens 134 at least covers the area of the light guide plate 120 corresponding to the location of the light emitting surface 112 of the light source 110. The Fresnel lens 134 can further diffuse the light emitted from the light sources 110 to make the plane light source provided by the backlight module 100 more uniform.

Figure 6:
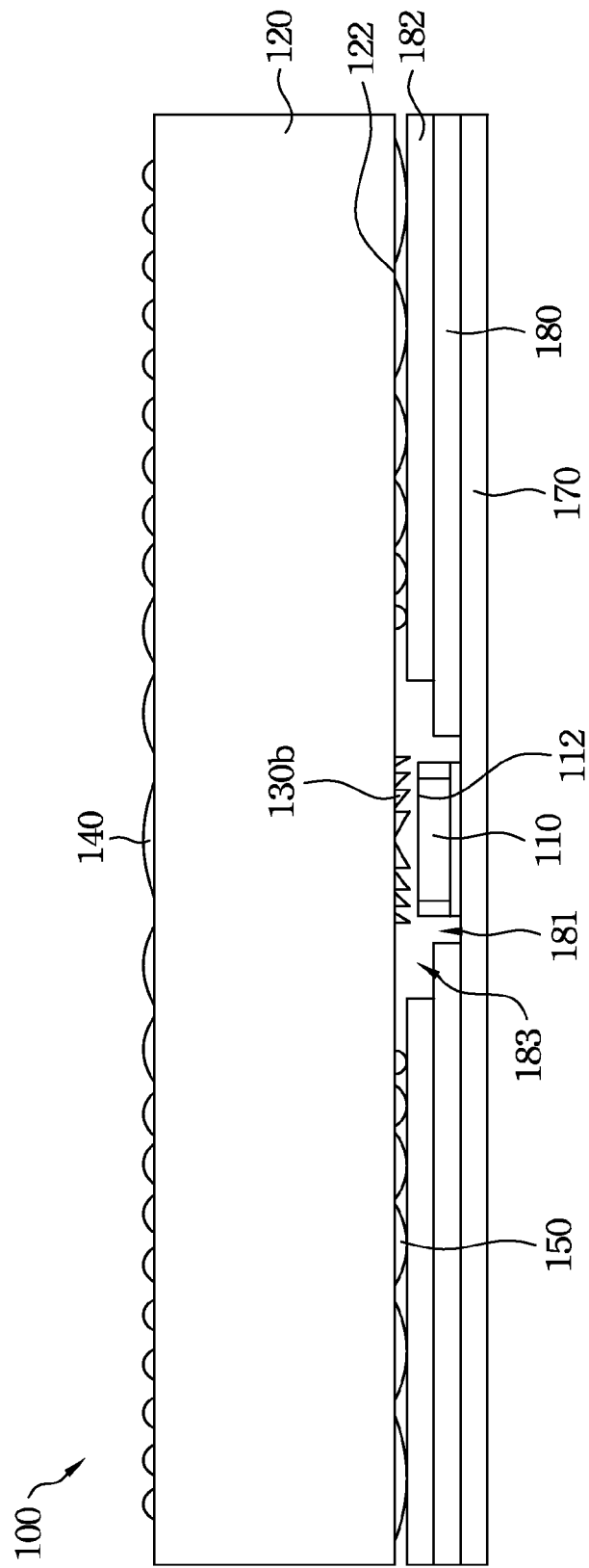
FIG. 6 is a cross-sectional diagram of a fourth embodiment of the backlight module of the invention.

FIG. 6 is a cross-sectional diagram of a fourth embodiment of the backlight module of the invention. The first surface 122 of the light guide plate 120 is a flat surface. The light scattering device 130b includes a plurality of Fresnel lenses formed on the first surface 122. Describing the structure corresponding to one of the light sources 110 as shown in FIG. 6, the Fresnel lens at least covers the area of the light guide plate 120 corresponding to the location of the light emitting surface 112 of the light source 110. The light scattering device 130b can further diffuse the light emitted from the light sources 110 to make the plane light source provided by the backlight module 100 more uniform.

The relative position of light guide plate 120 and the light sources 110 and the relative height between the light emitting surface 112 of the light sources 110 and the light guide plate 120 need to be maintained. The backlight module 100 in this embodiment includes two reflectors 180 and 182. The light sources 110 are disposed on the substrate 170. The reflectors 180 and 182 are disposed between the substrate 170 and the light guide plate 120. The reflector 180 is more close to the substrate 170, and the other reflector 182 is more close to the light guide plate 120.

Describing the structure related to one of the light sources 110 as shown in FIG. 6, the height of the light emitting surface 112 of the light source 110 is smaller than the height of the reflector 182, which is close to the light guide plate 120. The distance between the light source 110 and the first surface 122 is preferably smaller than the distance between the reflector 180 and the first surface 122 but greater than the distance between the reflector 182 and the first surface 122. The reflector 180 has a first opening 181, and the other reflector 182 has a second opening 183. The light source 110 is disposed on the substrate 170 and is located in the first opening 181 and the second opening 183. The size of the second opening 183 can be larger than the size of the first opening 181, so that the light emitted from the light source 110 can have a greater light scattering angle to prevent a local light halo from being formed around the light source 110.

Figure 7:
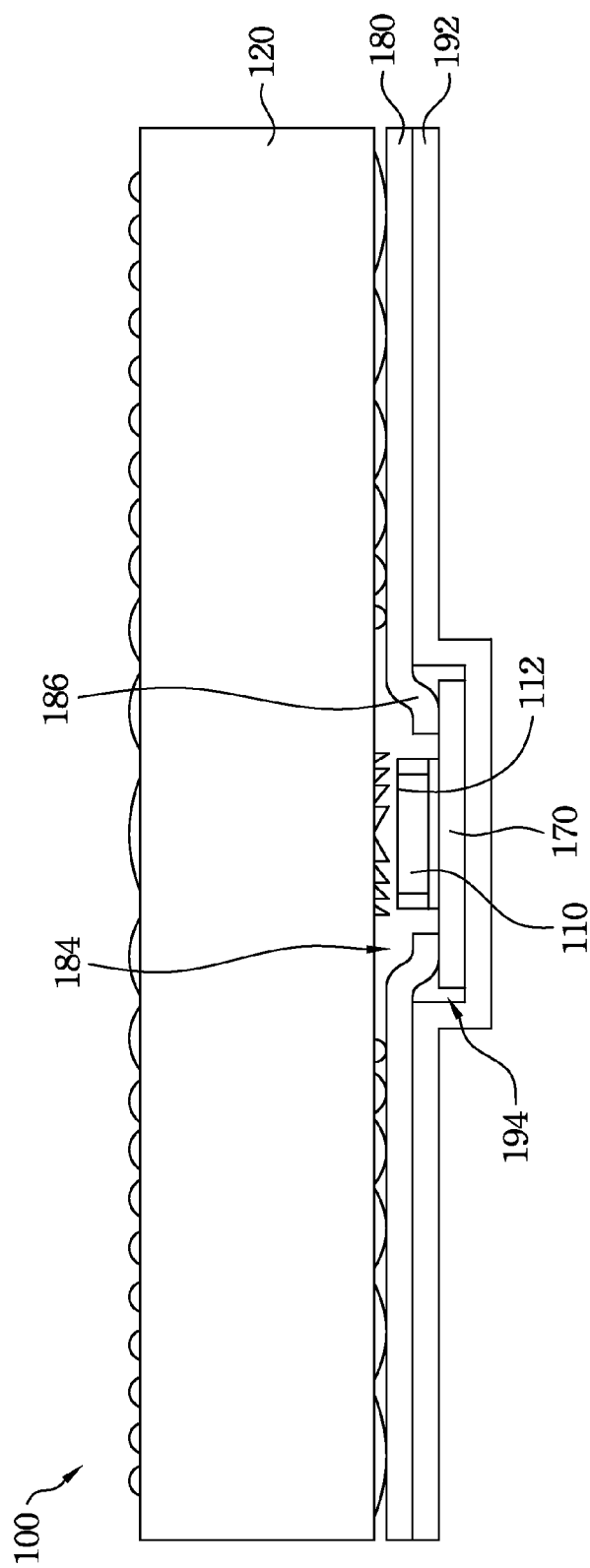
FIG. 7 is a cross-sectional diagram of a fifth embodiment of the backlight module of the invention.

FIG. 7 is a cross-sectional diagram of a fifth embodiment of the backlight module of the invention. The backlight module 100 further includes a back plate 192. The substrate 170, the reflector 180, and the light guide plate 120 are stacked on the back plate 192 in sequence. With respect to the structure related to one of the light sources 110, the back plate 192 can be recessed to maintain the relative height between the light emitting surface 112 of the light source 110 and the light guide plate 120. That is, the back plate 192 has a recess 194, the substrate 170 is disposed in the recess 194, and the light source 110 is disposed on the substrate 170 in the recess 194. The reflector 180 is disposed on the back plate 192. The reflector 180 has an opening 184 corresponding to the recess 194 in order to expose the light source 110. The reflector 180 has an inclined surface 186 near the light source 110 to define the opening 184 and to form a cup-shaped structure. Thus the light source 110 is disposed in the cup-shaped reflector 180.

The present invention includes the high-reflectance microstructure and the high-diffusion microstructure formed on the light guide plate to reduce normal light of the light sources, and the light emitted from the light sources can diffuse laterally, such that the backlight module provides a uniform plane light source. The backlight module includes the light scattering device to realize a large refraction angle of the light emitted from the light sources in order to reduce normal light. The high-diffusion plate can further make the light passing through the light guide plate more uniform.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module comprising:
    a plurality of light sources;
    a light guide plate having a first surface and a second surface opposite to the first surface, the first surface facing the light sources;
    a light scattering device disposed between the light sources and the light guide plate;
    a high-reflectance microstructure formed on the second surface; and
    a high-diffusion microstructure formed on or indented inwardly from the first surface.

2. The backlight module of claim 1, wherein a pattern density of the high-reflectance microstructure is gradually reduced from each of the light sources.

3. The backlight module of claim 2, wherein a covering ratio of the high-reflectance microstructure at areas corresponding to the light sources is greater than 70%.

4. The backlight module of claim 2, wherein a covering ratio of the high-reflectance microstructure at areas corresponding to a middle of neighboring light sources is greater than 30%.

5. The backlight module of claim 1, wherein a reflectance of the high-reflectance microstructure is greater than 70%.

6. The backlight module of claim 1, wherein a pattern density of the high-diffusion microstructure is gradually increased from each of the light sources.

7. The backlight module of claim 6, wherein a covering ratio of the high-diffusion microstructure at areas corresponding to the middle of the neighboring light sources is greater than 70%.

8. The backlight module of claim 6, wherein a covering ratio of the high-diffusion microstructure at areas corresponding to the light sources is approximately from 0% to 10%.

9. The backlight module of claim 1, wherein the high-diffusion microstructure is a raised structure formed on the first surface.

10. The backlight module of claim 1, wherein the high-diffusion microstructure is a concave structure indented inwardly from the first surface.

11. The backlight module of claim 1, wherein the light scattering device is disposed on the first surface and comprises a plurality of aspheric cavities, and the light sources are placed in the aspheric cavities, respectively.

12. The backlight module of claim 11, wherein a profile of the aspheric cavities is bullet-shaped.

13. The backlight module of claim 12, further comprising a plurality of lenses disposed on the light sources.

14. The backlight module of claim 13, wherein each of the lenses has a concave profile.

15. The backlight module of claim 11, wherein each of the aspheric cavities has a flat top surface, and the backlight module further comprises a plurality of Fresnel lenses each formed on the flat top surface of one of the aspheric cavities.

16. The backlight module of claim 15, wherein the first surface is a flat surface, and the light scattering device comprises a plurality of Fresnel lenses formed on the first surface.

17. The backlight module of claim 1, further comprising at least one reflector, wherein the reflector has a plurality of openings, and the light sources are disposed respectively in the openings.

18. The backlight module of claim 17, wherein a distance between the light sources and the first surface is less than a distance between the reflector and the first surface.

19. The backlight module of claim 17, further comprising a back plate, wherein the back plate comprises a plurality of recesses, and the light sources are disposed respectively in the recesses.

20. The backlight module of claim 17, wherein the reflector has a plurality of inclined surfaces for defining the openings.

21. The backlight module of claim 1, further comprising a high-diffusion plate disposed on the high-reflectance microstructure.

22. The backlight module of claim 21, wherein a transmittance of the high-diffusion plate is less than 70%.

* * * * *